US010279761B2

(12) United States Patent
Taniguchi

(10) Patent No.: US 10,279,761 B2
(45) Date of Patent: May 7, 2019

(54) VEHICLE POWER-SUPPLY DEVICE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Tomohiro Taniguchi, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

( * ) Notice: Subject to any disclaimer, the term of this patent is extended or adjusted under 35 U.S.C. 154(b) by 106 days.

(21) Appl. No.: 15/551,045

(22) PCT Filed: Feb. 18, 2016

(86) PCT No.: PCT/JP2016/054758
§ 371 (c)(1),
(2) Date: Aug. 15, 2017

(87) PCT Pub. No.: WO2016/133174
PCT Pub. Date: Aug. 25, 2016

(65) Prior Publication Data
US 2018/0015891 A1    Jan. 18, 2018

(30) Foreign Application Priority Data

Feb. 20, 2015 (JP) .................... 2015-031934

(51) Int. Cl.
*B60R 16/033* (2006.01)
*H02J 7/00* (2006.01)
(Continued)

(52) U.S. Cl.
CPC ............ *B60R 16/033* (2013.01); *F02N 11/04* (2013.01); *F02N 11/0862* (2013.01);
(Continued)

(58) Field of Classification Search
CPC .................................................. Y10T 307/839
See application file for complete search history.

(56) References Cited

U.S. PATENT DOCUMENTS

| 4,520,419 A | * | 5/1985 | Locher | ..................... | H02H 9/04 |
| | | | | | 307/10.7 |
| 8,344,541 B1 | * | 1/2013 | Li | ....................... | B60R 16/0232 |
| | | | | | 307/10.1 |

FOREIGN PATENT DOCUMENTS

| JP | 2007-082306 A | 3/2007 |
| JP | 2007-089350 A | 4/2007 |

(Continued)

OTHER PUBLICATIONS

ESPACENET translated claims for JP6330691B2, printed Jan. 22, 2019. (Year: 2019).*
Search Report for PCT/JP2016/054758, dated May 17, 2016.

*Primary Examiner* — Fritz M Fleming
(74) *Attorney, Agent, or Firm* — Honigman LLP

(57) ABSTRACT

A first power supply line and a second power supply line are connected to a load device. A power-supply control device supplies power of a first electrical storage device to the load device via the first power supply line. The power-supply control device supplies power of a second electrical storage device to the load device via the second power supply line. A fuse and a relay of the power-supply control device constitute a first current path between the first electrical storage device and the load device. A fuse and a relay of the power-supply control device constitute a second current path between the second electrical storage device and the load device. A control circuit detects the direction of current on (Continued)

the first current path and the second current path, and detects whether there is a short-circuit between the first power supply line and the second power supply line.

13 Claims, 1 Drawing Sheet

(51) Int. Cl.
  *F02N 11/04* (2006.01)
  *F02N 11/08* (2006.01)
  *H02J 7/14* (2006.01)
  *F02N 11/10* (2006.01)
(52) U.S. Cl.
  CPC ........ *F02N 11/0866* (2013.01); *F02N 11/108* (2013.01); *H02J 7/00* (2013.01); *H02J 7/1423* (2013.01); *H02J 7/1461* (2013.01); *F02N 2011/0885* (2013.01); *F02N 2200/062* (2013.01)

(56) References Cited

FOREIGN PATENT DOCUMENTS

| | | | |
|---|---|---|---|
| JP | 2011-111032 A | 6/2011 | |
| JP | 2013-141907 A | 7/2013 | |
| JP | 6330691 B2 * | 5/2018 | ........... B60R 16/033 |

* cited by examiner

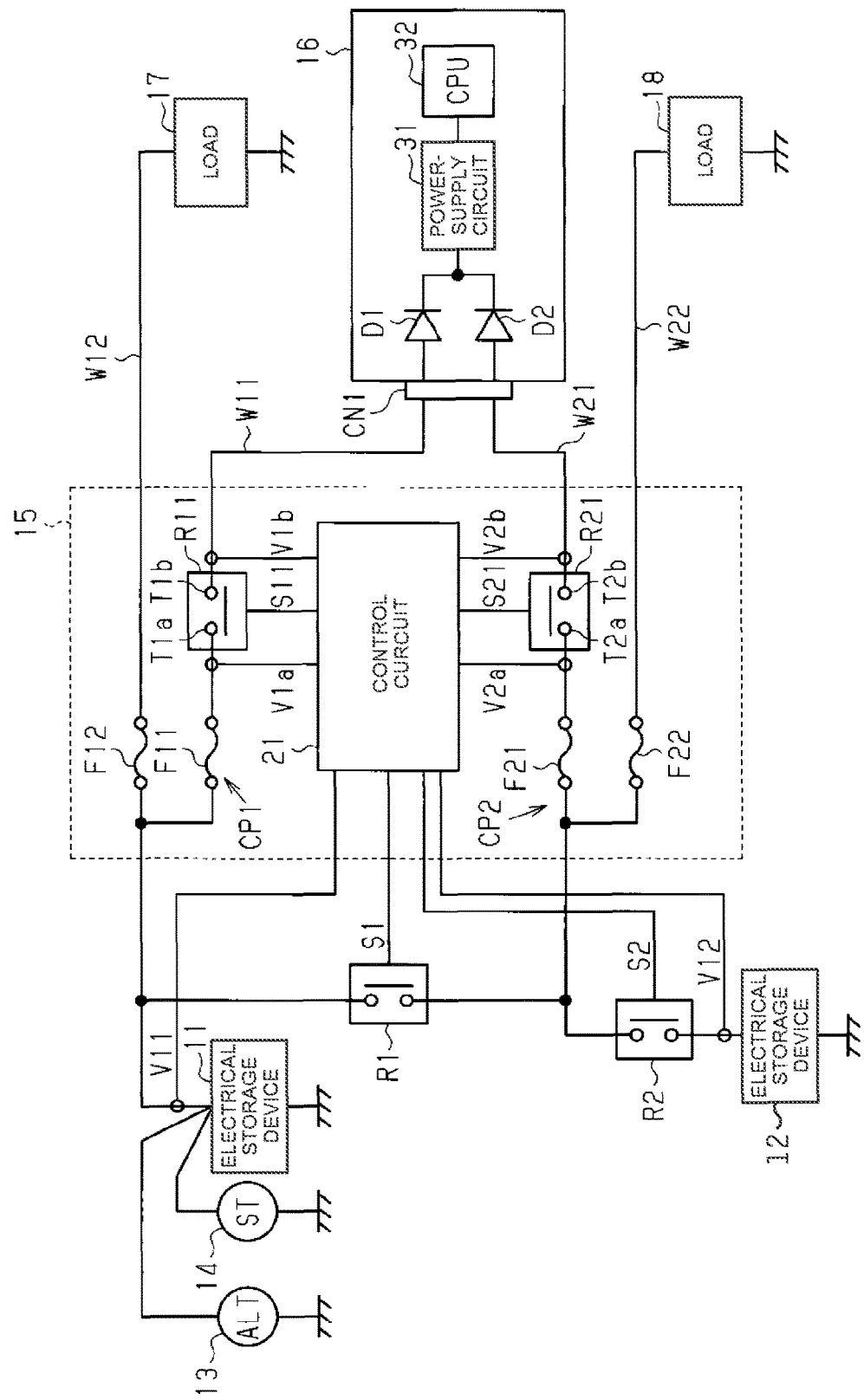

VEHICLE POWER-SUPPLY DEVICE

CROSS-REFERENCE TO RELATED APPLICATIONS

This application is the U.S. national stage of PCT/JP2016/054758 filed Feb. 18, 2016, which claims priority of Japanese Patent Application No. JP 2015-031934 filed Feb. 20, 2015.

TECHNICAL FIELD

The present invention relates to a vehicle power-supply device.

BACKGROUND

Conventionally, a plurality of load devices mounted in a vehicle operate based on power that is supplied from a battery. At the time of power supply failure due to malfunction or voltage reduction of the battery, operation of the respective load devices is no longer guaranteed. Thus, a power-supply system that determines a short-circuit abnormality of a battery based on a terminal voltage of that battery has been proposed (e.g., see JP 2011-111032A).

Incidentally, it is conceivable to employ a power-supply system that is provided with a plurality of batteries (e.g., main battery and sub-battery), and that supplies power to a load device from the sub-battery at the time of malfunction or voltage reduction of the main battery. The plurality of batteries are connected to the load device by one connector. Thus, there is risk of a short-circuit fault occurring between the paths through which power is supplied from the plurality of batteries to the load device. In a power-supply system that detects a short-circuit abnormality based on the terminal voltage of a battery such as abovementioned, it is difficult to detect a short-circuit fault between the paths.

The present invention was made in order to solve the above problems, and an object thereof is to easily detect a short-circuit abnormality.

SUMMARY

A vehicle power-supply device according to one aspect of the present invention is a vehicle power-supply device that supplies, to a load device to which a first power supply line and a second power supply line are connected via one connector, power of a first electrical storage device via the first power supply line and power of a second electrical storage device via the second power supply line, the vehicle power-supply device including a first switch in which a first terminal is connected to the first electrical storage device via a first fuse and a second terminal is connected to the first power supply line to form a first current path, a second switch in which a first terminal is connected to the second electrical storage device via a second fuse and a second terminal is connected to the second power supply line to form a second current path, and a control circuit that detects a direction of a first current that flows through the first current path and a direction of a second current that flows through the second current path, detects whether there is a short-circuit between the first power supply line and the second power supply line, based on the direction of the first current and the direction of the second current, and opens the first switch or the second switch based on a detection result.

According to this configuration, in the case where a first power supply line and a second power supply line configured to supply power to a load device from each of a first electrical storage device and a second electrical storage device short-circuit each other, current flows through a first current path and a second current path toward the second electrical storage device from the first electrical storage device or toward first electrical storage device from the second electrical storage device, according to the terminal voltage of the first electrical storage device and the terminal voltage of the second electrical storage device. Accordingly, a short-circuit abnormality between the first power supply line and the second power supply line is easily detected by the direction of current that flows through the first current path and the direction of current that flows through the second current path.

In a vehicle power-supply device according to some aspects, preferably the control circuit opens the first switch in a case where the first current is a reverse current that flows toward the first electrical storage device, and opens the second switch in a case where the second current is a reverse current that flows toward the second electrical storage device.

According to this configuration, the terminal voltage of the electrical storage device toward which current flows through a current path, that is, the terminal voltage of the electrical storage device to which current flows, will be lower than the terminal voltage of the electrical storage device from which current flows. Thus, the connection of the electrical storage device having a high terminal voltage is maintained and power is supplied to the load device.

In a vehicle power-supply device according to some aspects, preferably the control circuit detects the direction of the first current based on a terminal voltage of both terminals of the first switch, and detects the direction of the second current based on a terminal voltage of both terminals of the second switch.

According to this configuration, the current that flows through each current path and the direction thereof are easily detected, without using a current sensor or the like, for example.

In a vehicle power-supply device according to some aspects, preferably a starter motor that starts an engine installed in a vehicle is connected to the first electrical storage device, and the control circuit opens a third switch connected between the first electrical storage device and the second electrical storage device at a time of driving the starter motor.

According to this configuration, the first electrical storage device and the second electrical storage device are separated from each other when a third switch is opened (turned off). Accordingly, voltage fluctuation in the load device to which power is supplied by the second electrical storage device is suppressed.

In a vehicle power-supply device according to some aspects, preferably an electrical generator installed in a vehicle is connected to the first electrical storage device, and the control circuit closes the third switch connected between the first electrical storage device and the second electrical storage device when charging the second electrical storage device using power of the electrical generator, and opens the third switch when discharging the second electrical storage device.

According to this configuration, the third switch is closed (turned on) and the second electrical storage device is charged. The voltage of the second electrical storage device is then held, by opening (turning off) the third switch.

In a vehicle power-supply device according to some aspects, preferably the second switch is connected to the second electrical storage device via a fourth switch, the second electrical storage device is connected to the third switch via the fourth switch, and the control circuit performs opening/closing control of the fourth switch, based on a terminal voltage of the second electrical storage device.

According to this configuration, the second electrical storage device is protected from overcharging and the like, by opening (turning off) a fourth switch based on the terminal voltage, for example. Also, power supply from the first electrical storage device to the load device of the second electrical storage device becomes possible, by opening (turning off) the fourth switch and closing (turning on) the third switch at the time of failure of the second electrical storage device.

ADVANTAGEOUS EFFECTS

According to some aspects of the present invention, a vehicle power-supply device that is able to easily detect a short-circuit abnormality is obtained. Other aspects and advantages of the present invention will become apparent from the following description taken in conjunction with the accompanying drawings, which show by way of example the technical idea of the invention.

BRIEF DESCRIPTION OF DRAWINGS

FIG. 1 is a schematic configuration diagram of a power-supply system of an embodiment.

DETAILED DESCRIPTION OF PREFERRED EMBODIMENTS

Hereinafter, an embodiment will be described.

As shown in FIG. 1, a vehicle power-supply system has a first electrical storage device 11 and a second electrical storage device 12. The first electrical storage device 11 is a secondary battery such as a lead battery, for example. The second electrical storage device 12 is an electrical storage device having better chargeability and dischargeability than the first electrical storage device 11 and capable of being quickly charged. This second electrical storage device 12 is a secondary battery such as a lithium-ion battery, for example.

The first electrical storage device 11 is connected to an alternator (denoted as "ALT") 13 that serves as an electrical generator. Also, the first electrical storage device 11 is connected to a starter motor (denoted as "ST") 14. The first electrical storage device 11 is connected to the second electrical storage device 12 via relays R1 and R2. The relays R1 and R2 are electromagnetic relays, for example.

The alternator 13 is driven in tandem with an engine which is not illustrated, based on a control signal supplied according to a vehicle situation, and generates power. For example, at the time of acceleration, the alternator 13 is driven based on the rotation of the engine. Also, at the time of deceleration, wheels which are not illustrated rotate the engine, and the alternator 13 is driven according to the rotation of the engine. At the time when the alternator 13 is operating, the output power of the alternator 13 is supplied to the first electrical storage device 11, and the first electrical storage device 11 is charged. Also, at the time when the relays R1 and R2 are closed (on state), the output power of the alternator 13 is supplied to the second electrical storage device 12, and the second electrical storage device 12 is charged.

The starter motor 14 has power supplied thereto from the first electrical storage device 11 based on a control signal (start signal) that is output from an engine control ECU which is not illustrated. The engine which is not illustrated is started by the starter motor 14 which rotates as a result of the supplied power.

The first electrical storage device 11 is connected to a power-supply control device 15. Also, the second electrical storage device 12 is connected to the power-supply control device 15 via the relay R2.

The power-supply control device 15 is connected to a connector CN1 via the power supply lines W11 and W21, and the connector CN1 is connected to a load device 16. The power supply lines W11 and W21 are included in a wire harness that consists of a plurality of wiring, for example. The power supply line W11 may be referred to as a first power supply line, and the power supply line W21 may be referred to as a second power supply line. The load device 16 is an essential load such as an engine ECU or a gateway ECU of a network that is installed in the vehicle. The power-supply control device 15 supplies power of at least one of the first electrical storage device 11 and the second electrical storage device 12 to such an essential load. In other words, the power-supply control device 15 functions as a redundant power supply to the load device 16 which is an essential load.

Also, the power-supply control device 15 is connected to a load device (denoted merely as "load") 17 via a power supply line W12. This load device 17 is a general load such as a wiper motor or the motor of a radiator cooling fan, for example. The power-supply control device 15 supplies power of the first electrical storage device 11 to the load device 17 via the power supply line W12. Also, the power-supply control device 15 is connected to a load device (denoted merely as "load") 18 via a power supply line W22. This load device 18 is a constant voltage load that requires a stable power supply voltage such as a navigation system or an electronic control unit (ECU) of an air-conditioner. The power-supply control device 15 supplies power of the second electrical storage device 12 to the load device 17 via the power supply line W22.

The power-supply control device 15 is constituted as a power-supply box (electrical junction box) including a plurality of fuses F11, F12, F21 and F22. Furthermore, the power-supply control device 15 has a control circuit 21 and relays R11 and R21. The control circuit 21 performs opening/closing control of the relays R11 and R21. Also, the control circuit 21 of the present embodiment performs opening/closing control of the above relays R1 and R2. The relay R11 may be referred to as a first switch. The relay R21 may be referred to as a second switch. The relay R1 may be referred to as a third switch. The relay R2 may be referred to as a fourth switch.

Power of the first electrical storage device 11 is supplied to the load device 16 via the fuse F11, the relay R11 and the power supply line W11. The fuse F11, the relay R11 and an electrical wire (conductive member) connecting this fuse and relay constitute a first current path CP1 between the first electrical storage device 11 and the power supply line W11. Also, power of the first electrical storage device 11 is supplied to the load device 17 via the fuse F12 and the power supply line W12. Power of the second electrical storage device 12 is supplied to the load device 16 via the fuse F21, the relay R21 and the power supply line W21. The fuse F21, the relay R21 and an electrical wire (conductive member) connecting this fuse and relay constitute a second current path CP2 between the second electrical storage device 12 and the power supply line W21. Also, power of the second electrical storage device 12 is supplied to the load device 18 via the fuse F22 and the power supply line W22.

The load device 16 has diodes D1 and D2, a power-supply circuit 31, and a central processing unit (CPU) 32. Power of the first electrical storage device 11 is supplied to an anode of the diode D1. Power of the second electrical storage device 12 is supplied to an anode of the diode D2. The cathodes of the diodes D1 and D2 are connected to each other, and the connecting point thereof is connected to the power-supply circuit 31. Accordingly, power of at least one of the first electrical storage device 11 and the second electrical storage device 12 is supplied to the power-supply circuit 31.

The power-supply circuit 31 generates a power-supply voltage of the CPU 32. The power-supply circuit 31 is a regulator that generates a predetermined power-supply voltage such as a DC-DC circuit, for example. The CPU 32 operates using the power-supply voltage generated by the power-supply circuit 31.

The control circuit 21 of the power-supply control device 15 is connected to terminals T1a and T1b of the relay R11. The relay R11 is an electromagnetic relay, for example. The control circuit 21 performs opening/closing control of the relay R11, using a control signal (excitation current) S11 for the relay R11. The control circuit 21 detects terminal voltages V1a and V1b of both terminals T1a and T1b. The control circuit 21 then detects the direction of current that flows through this relay R11, based on the terminal voltages V1a and V1b of both terminals T1a and T1b. For example, when the voltage V1a of the terminal T1a is higher than the voltage V1b of the terminal T1b, current flows toward the terminal T1b from the terminal T1a, or in other words, toward the first load device 16 from the electrical storage device 11. Current that flows in this manner is taken as forward current. On the other hand, when the voltage V1a of the terminal T1a is lower than the voltage V1b of the terminal T1b, current flows toward the terminal T1a from the terminal T1b, or in other words, toward the electrical storage device 11 from the first load device 16. Current that flows in this manner is taken as reverse current. The control circuit 21 is assumed to open the relay R11 (off state) using the control signal S11, in the case where reverse current is detected based on the terminal voltages V1a and V1b of both terminals T1a and T1b of the relay 11.

Similarly, the control circuit 21 is connected to terminals T2a and T2b of the relay R21. The relay R21 is an electromagnetic relay, for example. The control circuit 21 performs opening/closing control of this relay R21, using a control signal (excitation current) S21 for the relay R21. The control circuit 21 detects terminal voltages V2a and V2b of both terminals T2a and T2b. The control circuit 21 then detects the direction of current that flows through this relay R21, based on the terminal voltages V2a and V2b of both terminals T2a and T2b. For example, when the voltage V2a of the terminal T2a is higher than the voltage V2b of the terminal T2b, current flows toward the terminal T2b from the terminal T2a, or in other words, toward the second load device 16 from the second electrical storage device 12. Current that flows in this manner is taken as forward current. On the other hand, when the voltage V2a of the terminal T2a is lower than the voltage V2b of the terminal T2b, current flows toward the terminal T2a from the terminal T2b, or in other words, toward the second electrical storage device 12 from the load device 16. Current that flows in this manner is taken as reverse current. The control circuit 21 opens (turns off) the relay R21 using the control signal S21, in the case where reverse current is detected based on the terminal voltages V2a and V2b of both terminals T2a and T2b of the relay 21.

Also, the control circuit 21 outputs control signals (excitation currents) S1 and S2 to the relays R1 and R2, and performs opening/closing control of the relays R1 and R2.

For example, the control circuit 21 detects a terminal voltage V12 of the second electrical storage device 12, closes (turns on) the relays R1 and R2 based on the terminal voltage V12, and charges the second electrical storage device 12. Also, the control circuit 21 opens (turns off) the relay R2, based on the terminal voltage V12, and prevents overcharging of the second electrical storage device 12. The second electrical storage device 12 is suited to quick charging and discharging, compared with the first electrical storage device 11. Accordingly, for example, power (regenerative power) that is produced by the alternator 13 at the time of deceleration of the vehicle can be easily stored. Also, installing the second electrical storage device 12 allows for a favorable recovery efficiency of regenerative energy, compared with a vehicle in which only the first electrical storage device 11 (lead battery) is installed.

Also, the control circuit 21 opens (turns off) the relay R2 at the time when the second electrical storage device 12 malfunctions, based on the terminal voltage V12 of the second electrical storage device 12. The second electrical storage device 12 is thereby separated from the load devices 16 and 18.

Also, the control circuit 21 opens (turns off) the relay R1 at the time of driving the starter motor 14. For example, the engine ECU stops the engine at the time when the vehicle has temporality stopped, and drives the starter motor 14 according to setting conditions to start the engine. At the time of driving the starter motor 14, the output voltage of the first electrical storage device 11 temporarily falls. Accordingly, fluctuation in the power-supply voltage that is supplied to the load devices 16 and 18 is suppressed, by opening (turning off) the relay R1.

Next, the action of the above vehicle power-supply system will be described.

Power of the first electrical storage device 11 is supplied to the load device 16 via the fuse F11 and the relay R11 of the power-supply control device 15 and the power supply line W11. Similarly, power of the second electrical storage device 12 is supplied to the load device 16 via the relay R2, the fuse F21 and the relay R21 of the power-supply control device 15, and the power supply line W21. At this time, the control circuit 21 opens (turns off) the relay R1. The power-supply circuit 31 of the load device 16 receives, by the diode D1 or D2, supply of power having a higher voltage out of power of the first electrical storage device and power of the second electrical storage device that are supplied. The power-supply circuit 31 generates the drive voltage of the CPU 32, based on the power that is supplied.

For example, in the case where the terminal voltage V11 of the first electrical storage device 11 is lower than the terminal voltage V12 of the second electrical storage device 12, or in the case where the first electrical storage device 11 fails, the power-supply circuit 31 generates the drive voltage of the CPU 32, based on power that is supplied from the second electrical storage device 12. At this time, inflow of current from the second electrical storage device 12 to the first electrical storage device 11 is prevented by the action of the diode D1.

Similarly, in the case where the terminal voltage V12 of the second electrical storage device 12 is lower than the terminal voltage V11 of the first electrical storage device 11, or in the case where the second electrical storage device 12 fails, the power-supply circuit 31 generates the drive voltage of the CPU 32, based on power that is supplied from the first electrical storage device 11. At this time, inflow of current from the first electrical storage device 11 to the second electrical storage device 12 is prevented by the action of the diode D2.

Incidentally, the power supply lines W11 and W21 that supply power of the first electrical storage device 11 and the second electrical storage device 12 are connected to the load device 16 by one connector CN1. Thus, there is a risk that a short-circuit (short) may occur between the power supply line W11 and the power supply line W12. In the case where such a short-circuit abnormality occurs, problems such as the following arises in a comparative example (vehicle power-supply system that is not provided with the power-supply control device 15 shown in FIG. 1). Note that in the description of the comparative example, the same reference signs as the above embodiment will be used.

For example, in the case where the terminal voltage V11 of the first electrical storage device 11 is lower than the terminal voltage V12 of the second electrical storage device 12 and the potential difference thereof is large (e.g., 4 volts (V)), a high current flows toward the first electrical storage device 11 via the power supply lines W21 and W11 from the second electrical storage device 12. In this case, a short-circuit abnormality cannot be detected with a determination method that is based on the terminal voltages V11 and V12 of the electrical storage devices 11 and 12. The fuse F21 of the power-supply control device 15 then blows due to the high current that flows between the second electrical storage device 12 and the first electrical storage device 11. As a result, the second electrical storage device 12 fails, and power is supplied to the load device 16 from only the first electrical storage device 11. In other words, there is no longer redundancy in power supply to the load device 16. In this state, power supply to the load device 16 will be disrupted when the first electrical storage device 11 fails, and the load device 16 will stop.

Also, in the case where the terminal voltage V11 of the first electrical storage device 11 is lower than the terminal voltage V12 of the second electrical storage device 12, and the potential difference thereof is small (e.g., 1 volt (V)), current of a level at which the fuses F21 and F11 do not blow flows toward the first electrical storage device 11 from the second electrical storage device 12 via the power supply lines W21 and W11. In this case, a short-circuit abnormality cannot be detected with a determination method that is based on the terminal voltages V11 and V12 of the electrical storage devices 11 and 12. Due to the current that flows between the second electrical storage device 12 and the first electrical storage device 11, the terminal voltage V12 of the second electrical storage device 12 then becomes substantially equal to the terminal voltage V11 of the first electrical storage device 11. That is, the terminal voltage V12 of the second electrical storage device 12 falls. Thus, the terminal voltage V12 of the second electrical storage device 12 can no longer be maintained at a high voltage. Also, even when an attempt is made to charge the second electrical storage device 12, the terminal voltage V12 of the second electrical storage device 12 tends not to rise, and regeneration efficiency falls, depending on the current that flows via the power supply lines W21 and W11 due to the short-circuit abnormality.

The case where a short-circuit abnormality such as the above occurs in the vehicle power-supply system of the present embodiment will be described.

For example, in the case where the terminal voltage V11 of the first electrical storage device 11 is lower than the terminal voltage V12 of the second electrical storage device 12, a high current flows toward the first electrical storage device 11 from the second electrical storage device 12 via the power supply lines W21 and W11. The control circuit 21 of the power-supply control device 15 detects the current that flows toward the first electrical storage device 11 from the second electrical storage device 12, based on the terminal voltages V1a and V1b of the terminals T1a and T1b of the relay R11, and opens (turns off) the relay R11 using the control signal S11. Thus, the control circuit 21 prevents inflow of current to the first electrical storage device 11 from the second electrical storage device 12 via the power supply lines W21 and W11. Accordingly, the control circuit 21 prevents the fuse F21 from blowing due to a short-circuit abnormality. As a result, power supply can be continued to the load device 16 from the second electrical storage device 12, and the load device 16 does not stop.

Since current does not flow to the first electrical storage device 11 from the second electrical storage device 12 via the power supply lines W21 and W11, the terminal voltage V12 of the second electrical storage device 12 can be maintained at a high voltage by opening (turning off) the relay R1. Also, since the terminal voltage V12 of the second electrical storage device 12 easily rises when the relays R1 and R2 are closed (turned on) to charge the second electrical storage device 12, the recovery efficiency of regenerative energy is favorable.

According to the present embodiment, the following effects are achieved, as described above.

(1) The power-supply control device 15 is connected to the load device 16 via the power supply line W11, the power supply line W21 and the connector CN1. The power-supply control device 15 supplies power of the first electrical storage device 11 to the load device 16 via the power supply line W11. Also, the power-supply control device 15 supplies power of the second electrical storage device 12 to the load device 16 via the power supply line W21. The fuse F11 and the relay R11 of the power-supply control device 15A constitute the first current path CP1 between the first electrical storage device 11 and the load device 16 (power supply line W11). The fuse F21 and the relay R21 of the power-supply control device 15 constitute the second current path CP2 between the second electrical storage device 12 and the load device 16 (power supply line W21). The control circuit 21 detects the direction of current on both the first current path CP1 and the second current path CP2, and detects whether there is a short-circuit between the power supply line W11 and the power supply line W21. The control circuit 21 then opens (turns off) the relay R11 or the relay R21, based on the detection result.

In the case where the power supply line W11 and the power supply line W21 short-circuit each other, current flows toward the second electrical storage device 12 from the first electrical storage device or toward the first electrical storage device 11 from the second electrical storage device 12 through the current path CP1 and current path CP2, according to the terminal voltage of the first electrical storage device 11 and the terminal voltage of the second electrical storage device 12. Accordingly, the short-circuit between the power supply line W11 and the power supply line W21 can be easily detected, by the direction of current that flows through the current path CP1 and the direction of current that flows through the current path CP2.

(2) The control circuit 21 detects a short-circuit abnormality between the power supply line W11 and the power supply line W21, based on the direction of current on the first current path CP1 and the direction of current on the second current path CP2. The control circuit 21 then turns the relay R11 off in the case where a reverse current is detected on the first current path CP1. The control circuit 21 can thereby prevent inflow of current from the second electrical storage device 12 to the first electrical storage device 11. Also, the control circuit 21 turns the relay R21 off in the case where a reverse current is detected on the second current path CP2. The control circuit 21 can thereby prevent inflow of current from the first electrical storage device 11 to the second electrical storage device 12.

(3) The control circuit 21 preferably opens the relay R11 in the case where the first current of the first current path CP1 is a reverse current that flows toward the first electrical storage device 11, and opens the relay R21 in the case where the second current of the second current path CP2 is a reverse current that flows toward the second electrical storage device 12. The terminal voltage of the electrical storage device 11 or 12 toward which current flows through the current path CP1 or CP2, that is, the terminal voltage of the electrical storage device to which current flows, will be lower than the terminal voltage of the electrical storage device from which current flows. Thus, power can be supplied to the load device 16 by maintaining the connection of the electrical storage device having a high terminal voltage.

(4) The control circuit 21 detects the direction of current that flows through the relay R11 based on the terminal voltages V1a and V1b of the terminals T1a and T1b of the relay R11. Also, the control circuit 21 detects the direction of current that flows through the relay R21 based on the terminal voltages V2a and V2b of the terminals T2a and T2b of the relay R21. Accordingly, the direction of current that flows through the current paths CP1 and CP2 can be easily detected, without using a current sensor or the like, for example.

(5) The starter motor 14 that starts the engine installed in the vehicle is connected to the first electrical storage device 11. The control circuit 21 opens (turns off) the relay R1 connected between the first electrical storage device 11 and the second electrical storage device 12 at the time of driving the starter motor 14. At the time of driving the starter motor 14, the terminal voltage V11 of the first electrical storage device 11 fluctuates. The load devices 16 and 18 require a stable power-supply voltage. Accordingly, fluctuation in the power-supply voltage of the load devices 16 and 18 can be suppressed by turning off the relay R1.

(6) The alternator 13 installed in the vehicle is connected to the first electrical storage device 11. The control circuit 21 closes (turns on) the relay R1 connected between the first electrical storage device 11 and the second electrical storage device 12 when charging the second electrical storage device 12, and opens (turns off) the relay R1 when discharging the second electrical storage device 12. Thus, the second electrical storage device 12 can be charged, and power of the second electrical storage device 12 can be supplied to the load devices 16 and 18.

(7) The first electrical storage device 11 is connected to the second electrical storage device 12 via the relay R1 and the relay R2. The control circuit 21 performs opening/closing control of the relay R2, based on the terminal voltage V12 of the second electrical storage device 12. By opening and closing of the relay R2, the second electrical storage device 12 can be protected from overcharging and the like. Also, by opening (turning off) the relay R2 and closing (turning on) the relay R1 at the time of failure of the second electrical storage device 12, power supply from the first electrical storage device 11 to the load device 18 can be made possible.

Note that the following modes can be carried out in the above embodiment.

In the above embodiment, current that flows from one electrical storage device to another electrical storage device via the power supply lines W11 and W21 need only be interrupted, and the relay that opens (turns off) may be changed as appropriate. For example, in the above embodiment, the relay R11 is opened (turned off) when a reverse current flows through the relay R1, but the relay R21 may be opened (turned off). Similarly, the relay R11 may be opened (turned off) when a reverse current flows through the relay R21.

Also, the relay that is opened (turned off) may be set in advance, and the relay may be opened (turned off) according to the settings in the case where a reverse current is detected. Also, the relay that is opened (turned off) may be determined based on the terminal voltages V11 and V12 of the electrical storage devices 11 and 12.

The control circuit 21 may be one or more microcomputers including one or more processors and at least one memory including computer-executable commands that are executable by the one or more processors. In this case, the functions described in the aforementioned embodiment are realized, when the one or more processors execute the computer-executable commands. The control circuit 21 may have a connection terminal or an interface for connecting to at least the relays R11 and R12.

In the above embodiment, the control circuit 21 is a single control circuit for performing opening/closing control of the relays R1 and R2, but can be changed as appropriate. For example, the control circuit 21 may be replaced with a plurality of control circuits configured or programmed to respectively control the relays R1 and R2. Alternatively, the control circuit 21 may be replaced with one or more control circuits configured or programmed to further control other elements or devices apart from the relays R1 and R2. For example, a configuration may be adopted in which opening/closing control of the relay R1 is performed by a dedicated electronic control unit (ECU) or an engine control unit (ECU). Also, a configuration may be adopted in which opening/closing control of the relay R2 is performed by a control circuit provided in the electrical storage device 12. Also, a configuration may be adopted in which opening/closing control of the relay R2 is performed by a dedicated electronic control unit (ECU) or engine control unit (ECU).

The first electrical storage device 11 of the above embodiment may be configured as a secondary battery such as a nickel-cadmium battery.

The second electrical storage device 12 of the above embodiment may be configured as a secondary battery such as a nickel-hydrogen battery. Also the second electrical storage device 12 may be configured as a capacitor. An electric double layer capacitor, a lithium-ion capacitor or the like can be used as the capacitor. Also, the second electrical storage device 12 may be configured as a composite power supply of a secondary battery and a capacitor.

A mechanical switch may be used for the relays R1, R2, R11 and R21 of the above embodiment. Also, a semiconductor switch such as a field-effect transistor (FET) or an insulated gate bipolar transistor (IGBT) may be used.

The following working examples are also included in this disclosure. Note that reference to member numerals is to facilitate understanding, and is not intended as a limitation.

WORKING EXAMPLE 1

A vehicle power-supply system is provided with a first electrical storage device (11); a second electrical storage device (12); a load device (16); a first power supply line (W11) that is connected to the load device (16) in order to supply power of the electrical storage device (11) to the load device (16); a second power supply line (W21) that is connected to the load device (16) in order to supply power of the second electrical storage device (12) to the load device (16); a first fuse (F11) and a first switch (R11) that are connected to the first power supply line (W11) and configured to electrically connect and disconnect the first electrical storage device (11) and the first power supply line (W11); a second fuse (F21) and a second switch (R21) that are connected to the second power supply line (W21) and configured to electrically connect and disconnect the second electrical storage device (12) and the second power supply line (W21); and a controller (21) that is connected to the first switch (R11) and the second switch (R21), and detects the direction of a first current that flows through the first fuse (F11) and the first switch (R11) and the direction of a second current that flows through the second fuse (F21) and the second switch (R21), the controller (21) being configured to detect a short-circuit of the first power supply line (W11) and the second power supply line (W21), based on the direction of the first current and the direction of the second current, and to open one of the first switch (R11) and the second switch (R21) while maintaining the other of the first switch (R11) and the second switch (R21) in a closed state, when a short-circuit is detected.

WORKING EXAMPLE 2

A short-circuit detection method in a vehicle power-supply system, the vehicle power-supply system including a first electrical storage device (11); a second electrical storage device (12); a load device (16); a first power supply line (W11) that is connected to the load device (16) in order to supply power of the electrical storage device (11) to the load device (16); a second power supply line (W21) that is connected to the load device (16) in order to supply power of the second electrical storage device (12) to the load device (16); a first fuse (F11) and a first switch (R11) that are connected to the first power supply line (W11), and configured to electrically connect and disconnect the first electrical storage device (11) and the first power supply line (W11); a second fuse (F21) and a second switch (R21) that are connected to the second power supply line (W21) and configured to electrically connect and disconnect the second electrical storage device (12) and the second power supply line (W21); and a controller (21) that is connected to the first switch (R11) and the second switch (R21), the short-circuit detection method including detecting, by the controller (21), the direction of a first current that flows through the first fuse (F11) and the first switch (R11) and the direction of a second current that flows through the second fuse (F21) and the second switch (R21), and detecting, by the controller (21), a short-circuit of the first power supply line (W11) and the second power supply line (W21), based on the direction of the first current and the direction of the second current.

WORKING EXAMPLE 3

An operation method for the vehicle power-supply system, the operation method including controlling the first switch (R11) and the second switch (R21) to open one of the first switch (R11) and the second switch (R21) while maintaining the other of the first switch (R11) and the second switch (R21) in a closed state, when a short-circuit of the first power supply line (W11) and the second power supply line (W21) is detected in accordance with the short-circuit detection method.

The present invention is not limited to that illustrated above. For example, the illustrated features should not be interpreted as being essential to the invention, and the subject matter of the invention may be present in fewer than all of the features of disclosed specific embodiments. Therefore, the scope of the invention is to be determined, not by reference to illustrated embodiments, but by reference to the claims together with all equivalents thereof.

The invention claimed is:

1. A vehicle power-supply device that supplies, to a load device to which a first power supply line and a second power supply line are connected via one connector, power of a first electrical storage device via the first power supply line and power of a second electrical storage device via the second power supply line, comprising:
    a first switch in which a first terminal is connected to the first electrical storage device via a first fuse and a second terminal is connected to the first power supply line to form a first current path;
    a second switch in which a first terminal is connected to the second electrical storage device via a second fuse and a second terminal is connected to the second power supply line to form a second current path; and
    a control circuit that detects a direction of a first current that flows through the first current path and a direction of a second current that flows through the second current path, detects whether there is a short-circuit between the first power supply line and the second power supply line, based on the direction of the first current and the direction of the second current, and opens the first switch or the second switch based on a detection result.

2. The vehicle power-supply device according to claim 1, wherein the control circuit opens the first switch in a case where the first current is a reverse current that flows toward the first electrical storage device, and opens the second switch in a case where the second current is a reverse current that flows toward the second electrical storage device.

3. The vehicle power-supply device according to claim 2, wherein the control circuit detects the direction of the first current based on a terminal voltage of both terminals of the first switch, and detects the direction of the second current based on a terminal voltage of both terminals of the second switch.

4. The vehicle power-supply device according to claim 2, wherein a starter motor that starts an engine installed in a vehicle is connected to the first electrical storage device, and
    the control circuit opens a third switch connected between the first electrical storage device and the second electrical storage device at a time of driving the starter motor.

5. The vehicle power-supply device according to claim 2, wherein an electrical generator installed in a vehicle is connected to the first electrical storage device, and
    the control circuit closes the third switch connected between the first electrical storage device and the second electrical storage device when charging the second electrical storage device using power of the electrical generator, and opens the third switch when discharging the second electrical storage device.

6. The vehicle power-supply device according to claim 1, wherein the control circuit detects the direction of the first current based on a terminal voltage of both terminals of the first switch, and detects the direction of the second current based on a terminal voltage of both terminals of the second switch.

7. The vehicle power-supply device according to claim 6, wherein a starter motor that starts an engine installed in a vehicle is connected to the first electrical storage device, and
the control circuit opens a third switch connected between the first electrical storage device and the second electrical storage device at a time of driving the starter motor.

8. The vehicle power-supply device according to claim 6, wherein an electrical generator installed in a vehicle is connected to the first electrical storage device, and
the control circuit closes the third switch connected between the first electrical storage device and the second electrical storage device when charging the second electrical storage device using power of the electrical generator, and opens the third switch when discharging the second electrical storage device.

9. The vehicle power-supply device according to claim 1, wherein a starter motor that starts an engine installed in a vehicle is connected to the first electrical storage device, and
the control circuit opens a third switch connected between the first electrical storage device and the second electrical storage device at a time of driving the starter motor.

10. The vehicle power-supply device according to claim 9, wherein the second switch is connected to the second electrical storage device via a fourth switch,
the second electrical storage device is connected to the third switch via the fourth switch, and
the control circuit performs opening/closing control of the fourth switch, based on a terminal voltage of the second electrical storage device.

11. The vehicle power-supply device according to claim 9, wherein an electrical generator installed in a vehicle is connected to the first electrical storage device, and
the control circuit closes the third switch connected between the first electrical storage device and the second electrical storage device when charging the second electrical storage device using power of the electrical generator, and opens the third switch when discharging the second electrical storage device.

12. The vehicle power-supply device according to claim 9, wherein the second switch is connected to the second electrical storage device via a fourth switch,
the second electrical storage device is connected to the third switch via the fourth switch, and
the control circuit performs opening/closing control of the fourth switch, based on a terminal voltage of the second electrical storage device.

13. The vehicle power-supply device according to claim 1,
wherein an electrical generator installed in a vehicle is connected to the first electrical storage device, and
the control circuit closes the third switch connected between the first electrical storage device and the second electrical storage device when charging the second electrical storage device using power of the electrical generator, and opens the third switch when discharging the second electrical storage device.

* * * * *